B. BAKKE.
TREATMENT OF LIQUIDS TO EFFECT CRYSTALLIZATION THEREFROM WHILE THE LIQUID IS KEPT IN MOTION.
APPLICATION FILED SEPT. 29, 1919.
1,329,158.
Patented Jan. 27, 1920.
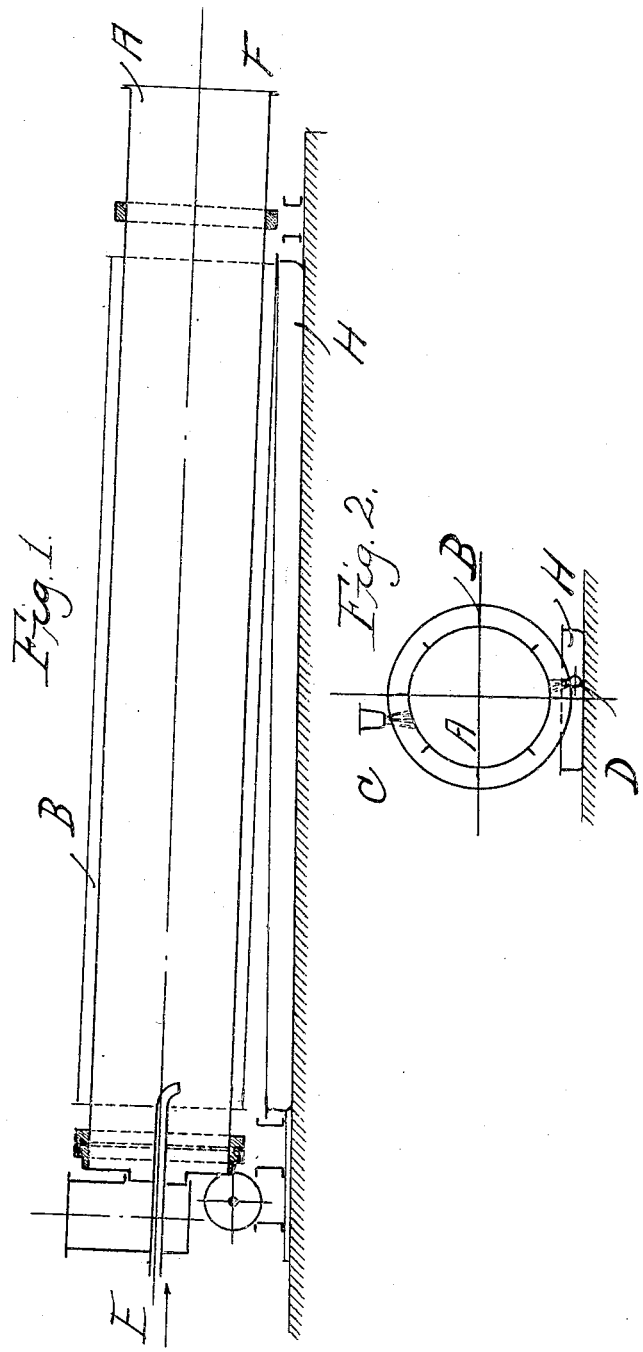

UNITED STATES PATENT OFFICE.

BJARNE BAKKE, OF CHRISTIANIA, NORWAY, ASSIGNOR TO NORSK HYDRO-ELEKTRISK KVAELSTOFAKTIESELSKAB, OF CHRISTIANIA, NORWAY.

TREATMENT OF LIQUIDS TO EFFECT CRYSTALLIZATION THEREFROM WHILE THE LIQUID IS KEPT IN MOTION.

1,329,158.   Specification of Letters Patent.   Patented Jan. 27, 1920.

Application filed September 29, 1919. Serial No. 327,304.

*To all whom it may concern:*

Be it known that I, BJARNE BAKKE, a subject of the King of Norway, residing at Christiania, Norway, have invented certain new and useful Improvements in the Treatment of Liquids to Effect Crystallization Therefrom While the Liquid is Kept in Motion; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to processes and means to effect the crystallization from solutions and has reference more particularly to that type of crystallization processes and apparatus in which the solution is maintained in motion during the crystallization operation.

An apparatus of this type is known, which comprises a rotating cylinder which is cooled by means of water.

In the known apparatus of this type, the liquid which is carried along with the inner cylinder surface during the rotation is liable to become too strongly cooled. This is a great drawback particularly when the crystallization is to take place at an elevated temperature in order to bring about a fractional crystallization because impure salt will then crystallize upon the interior surface of the cylinder. These impure crystals will then contaminate the substance which it is desired to separate by crystallization at a determined temperature.

According to the present invention these difficulties are obviated in the manner, that the upper part of the cylinder is maintained at such a high temperature, that under-cooling and crystallization cannot take place at that part of the interior cylinder surface which is situated above the crystallizing liquid.

This may be effected by subjecting only the lower part of the cylinder to the action of a suitable cooling fluid or by combining this method of cooling with the supply of a fluid of a higher temperature to the top section of the cylinder.

An apparatus which may be employed for carrying the invention into effect is diagrammatically illustrated in the accompanying drawing by way of example.

Figure 1 is a longitudinal sectional view of the apparatus.

Fig. 2 is a transverse sectional view of the same.

In the illustrated example A is a rotating cylinder into which the liquid to be treated is introduced at E. The liquid flows through the cylinder toward the lower end of the same where the crystal mass is discharged at F. The exterior surface of the cylinder is provided with a number of longitudinally arranged ribs B. Warm water is supplied to the top of the cylinder through perforations in the bottom of the gutter C, so as to maintain the top part of the cylinder at the desired temperature. Cold or temperate water is supplied through D to cool the cylinder to the crystallization temperature. A trough H is arranged below the cylinder to take up the heating and cooling water from the cylinder surface.

I claim:

1. In the treatment of liquids to effect crystallization therefrom while the liquid is kept in motion in a revolving tube the method which consists in maintaining the top part of the tube at a comparatively high temperature at the same time as the bottom part of the tube is subjected to cooling.

2. Process according to claim 1 in which a cooling fluid is applied to the bottom part of the tube, while a fluid of a higher temperature than that of the cooling fluid is applied to the top part of the tube.

3. Apparatus for the crystallization from liquids which are maintained in motion comprising a revolving tube, means to supply liquid to be treated to one end of the tube, means to withdraw the treated liquid from the opposite end of the tube, means to supply cooling fluid to the exterior surface of the bottom part of the cylinder and means to supply a heated fluid to the exterior surface of the top part of the cylinder.

4. Apparatus for the crystallization from liquids which are maintained in motion comprising a revolving tube, a plurality of longitudinally arranged ribs on the exterior surface of the tube, means to supply liquid to be treated to one end of the tube, means to withdraw the treated liquid from the opposite end of the tube, means to supply cooling fluid to the exterior surface of the bottom part of the cylinder and means to supply a heated fluid to the exterior surface of the top part of the cylinder.

In testimony that I claim the foregoing as my invention, I have signed my name in presence of two subscribing witnesses.

BJARNE BAKKE.

Witnesses:
A. N. HEDEUSCHAU,
C. VARMAR.